Patented Nov. 9, 1943

2,333,663

UNITED STATES PATENT OFFICE 2,333,663

MANUFACTURE OF TITANIUM OXIDE PIGMENTS

Andrew T. McCord and Harold F. Saunders, Haddonfield, N. J., assignors to The Sherwin-Williams Company, Cleveland, Ohio, a corporation of Ohio No Drawing. Application May 2, 1942, Serial No. 441,533

14 Claims. (Cl. 106—300)

This invention relates to the preparation of titanium pigments, and particularly to the preparation of nuclear solution and seed crystals and their use in the precipitation of titanium compounds by hydrolysis at elevated temperatures of sulphuric acid solutions containing titanium.

This application is a continuation-in-part of our prior copending application Serial No. 377,046, and so far as it involves the formation of an extended pigment, it is a continuation-in-part of prior application 349,345, filed August 1, 1940, (Patent No. 2,326,156, issued August 10, 1943), in which there is disclosed and claimed the forming of a pigment composed of rutile and an extender by forming a slurry of $\gamma$-titanic acid and the extender in water containing sulphuric acid, boiling the slurry, separating, washing and calcining.

In copending application Serial 377,046 we have disclosed that when the anatase of prior art, obtained as by the thermal hydrolysis of ilmenite or another titanium sulphate solutions, is added to a further quantity of ilmenite solution, or titanium sulphate solution as a seeding or nucleating material, and the seeded solution then hydrolyzed by boiling to precipitate the titanium content as a hydrous titanium oxide of anatase crystalline structure, the anatase so obtained, upon heating to temperatures up to 1000° C. retains its anatase form as demonstrable by X-ray examination.

When however a specific form of hydrous titanium oxide which we have termed "$\gamma$-titanic" acid is used as seeding or nucleating material added to ilmenite solutions or titanium sulphate solutions, and the resulting nucleated solution is hydrolyzed by boiling, the titanium content is precipitated as a hydrous oxide in the structural form of anatase as shown by X-ray examination, but the hydrous titanic oxide of anatase form so obtained differs from that obtained by thermal hydrolysis of an ilmenite solution or a sulphuric acid solution of titanium, in that upon heating to temperatures below 1000° C., and within the range of 800°–1000° C., it is entirely converted to the rutile modification.

"$\gamma$-titanic acid" is defined in Serial 370,486, filed December 17, 1940 (Patent No. 2,326,157, issued August 10, 1943), as a form of hydrous titanium oxide characterized by possessing a crystal lattice, the chemical elements of which are so arranged that upon X-ray analysis a band diffraction pattern is obtained, the bands of which when measured upon a scale calibrated in Angstrom units, are located at and correspond to atomic spacings of 5.83; 3.99; 3.145; 2.600; 2.342; 2.132; 1.888; 1.696; 1.499; 1.357; 1.247; 1.177; 1.087; 1.048; 1.011; 0.956; 0.917; 0.894; 0.868; 0.843; 0.813; 0.785; 0.747; 0.712; 0.692; 0.682; 0.670; and 0.656 Å.

In Serial 377,046 we have further disclosed that $\gamma$-titanic acid may itself be converted into a hydrous titanium oxide of anatase modification by a number of means including heating at temperature between 100° C. and 700° C. either dry or in aqueous suspension and by dispersion in sulphuric acid followed by reprecipitation by boiling, and that the anatase modification obtained in this manner behaves like $\gamma$-titanic acid itself in that when used as a seeding or nucleating addition to ilmenite solution or titanium sulphate solution followed by hydrolysis of the said nucleated solution by boiling, the titanium content of the solution is precipitated as a hydrous titanium oxide of anatase form but which may be converted to the rutile modification by boiling within the range 800–1000° C.

We have now found that by thermal hydrolysis of a titanium fluoride solution, a titanium oxide of anatase form may be precipitated and that the anatase may be used in the same manner and with the same results as the anatase derived from $\gamma$-titanic acid.

In carrying out our present process, we employ as a seeding or nucleating agent for a titanium-containing solution, anatase such as that formed by thermal hydrolysis of titanium tetrafluoride solutions, and by means of our process we obtain a product which may be calcined to produce pigmentary rutile. The titanium-containing solution may be an ilmenite solution and this may have an extender such as calcium sulphate added thereto prior to hydrolysis to thereby permit the direct formation of an extended pigment having its titanium content in the rutile crystalline form.

As was shown by Weiser and Milligan, the product obtained by thermal hydrolysis of titanium tetrachloride solution was rutile. We have found, however, that the product obtained by thermal hydrolysis of titanium tetrafluoride is anatase.

As an example, the process may be carried out as follows:

An aqueous solution of titanium tetrafluoride containing 10% $TiO_2$ and 12% HF was boiled until hydrolysis was substantially complete. The hydrate was separated and washed until the filtrate was acid-free and a portion of the hydrate at this point air-dried at 60° C. showed upon X-ray examination a band pattern the bands of which corresponded to the characteristic pattern upon the scale in Å. of those of anatase, but when calcined for one hour at 950° C. was completely converted to pigmentary rutile of excellent brightness, hiding power and texture. The wet hydrate was redispersed in an equal weight of 96% sulphuric acid, and the clear viscous mass diluted with 25% of its weight of water. A quantity equivalent to 2 grams of $TiO_2$ was added to one kilogram of ilmenite solution containing 13% $TiO_2$ and 26% acid. The nucleated solution was then boiled for six hours, filtered and washed until virtually iron-free. An X-ray diffraction pattern of a dried sample proved the precipitate to be anatase. The cake upon calcination for two hours at 950° was converted to pigmentary rutile of high hiding power and brigthness and excellent texture, and the diffraction pattern upon X-ray analysis was that characteristic of rutile.

The anatase obtained by the present method, i. e. thermal hydrolysis of titanium tetrafluoride, may also be used for nucleating an ilmenite solution to which is added prior to hydrolysis an extender pigment, and the hydrolysis effected in the presence of such extender pigment to produce a titanium extended pigment, the titanium content of which will be in the rutile crystalline form.

In preparing an extended rutile pigment of this type, a quantity of calcium sulphate in the form of anhydrite or of other extender pigment such as barium sulphate in such proportion that the extending pigment will be in a ratio of 70 lbs. to each 30 lbs. of $TiO_2$ present, may be added to the nucleated ilmenite solution prior to boiling, and the process continued as described. The proportion of 70:30 is used in an illustrative manner and any proportion of the extender and $TiO_2$ desired may be employed. Or as an alternative method, the extender pigment such as anhydrite, barium sulphate, silica. etc. may be added to the precipitated hydrous titanium oxide of anatase form prior to calcination or after calcination to produce an extended titanium pigment, the titanium oxide content of which is in the form of rutile. The temperature employed may be between about 800° or somewhat less up to 1000° C. At 850–900° satisfactory conversion of the $TiO_2$ to rutile is obtained within a reasonable length of time. Our preferred method of heating is to feed the material into a rotary calciner at such speed of rotation of the calciner drum that the material is in the effective calcination zone for a period of from 2 to 4 hours, but since many modifications of time and temperature are possible within the scope of the invention, we do not wish to be bound either by these conditions or the type of heating apparatus used. With the selection of any predetermined temperature within the range of 800–1000° C., the calciner may be operated at such speed of rotation as to insure a sufficient length of time of the material in the effective calcination zone that a sample of the material discharged will upon X-ray examination show among the lines on the pattern due to titanium oxide only those characteristic of rutile.

Having thus described our invention, what we claim as new and desire to secure by Letters Patent is:

1. The process of making rutile, which includes thermally hydrolyzing titanium tetrafluoride to form an anatase, and nucleating a sulphuric acid ilmenite solution with said anatase.

2. The process of making an extended rutile pigment which includes thermally hydrolyzing a solution of titanium tetrafluoride to form an anatase, nucleating a sulphuric acid ilmenite solution with said anatase, said solution containing an extender, hydrolyzing said solution by boiling, washing the resulting precipitate, and calcining.

3. The process of making pigmentary rutile which includes forming an anatase by thermally hydrolyzing an aqueous solution of titanium tetrafluoride, nucleating an ilmenite solution with a small quantity of said anatase, boiling, filtering, washing and calcining.

4. The process of making pigmentary rutile which includes forming an anatase by thermally hydrolyzing an aqueous solution of titanium tetrafluoride, separating, washing and filtering the anatase so obtained, nucleating an ilmenite solution with a small quantity of said anatase, boiling, filtering, washing and calcining.

5. The process of making pigmentary rutile which includes forming hydrous titanium oxide in the anatase modification by thermally hydrolyzing an aqueous solution of titanium tetrafluoride, separating, washing and filtering the anatase so obtained, nucleating an ilmenite solution with a small quantity of said anatase, boiling, filtering, washing and heating until the titanium content is substantially completely converted to rutile.

6. The process of making an extended rutile pigment which includes forming an anatase by thermally hydrolyzing an aqueous solution of titanium tetrafluoride, nucleating an ilmenite solution containing an extender with a small quantity of said anatase, boiling, filtering, washing and calcining.

7. The process of making an extended rutile pigment which includes forming an anatase by thermally hydrolyzing an aqueous solution of titanium tetrafluoride, nucleating an ilmenite solution containing calcium sulphate with a small quantity of said anatase, boiling, filtering, washing and calcining.

8. The process of making an extended rutile pigment which includes forming an anatase by thermally hydrolyzing an aqueous solution of titanium tetraflouride, nucleating an ilmenite solution containing calcium sulphate in the anhydrite form with a small quantity of said anatase, boiling, filtering, washing and calcining.

9. The process of making an extended rutile pigment which includes forming an anatase by thermally hydrolyzing an aqueous solution of titanium tetrafluoride, separating, washing and filtering the anatase so obtained, nucleating an ilmenite solution containing an extender with a small quantity of said anatase, boiling, filtering, washing and calcining.

10. The process of making an extended rutile pigment which includes forming an anatase by thermally hydrolyzing an aqueous solution of titanium tetrafluoride, separating, washing and filtering the anatase so obtained, nucleating an ilmenite solution containing calcium sulphate with a small quantity of said anatase, boiling, filtering, washing and calcining.

11. The process of making pigmentary rutile which includes forming an anatase by thermally hydrolyzing an aqueous solution of titanium tetrafluoride, nucleating an ilmenite solution with a small quantity of said anatase, boiling, filtering and washing to produce anatase, and calcining said last mentioned anatase at a temperature below 1000° C. to form pigmentary rutile.

12. The process of making pigmentary rutile which includes forming an anatase by thermally hydrolyzing an aqueous solution of titanium tetrafluoride, nucleating an ilmenite solution with a small quantity of said anatase, boiling, filtering and washing to produce anatase, and heating said last mentioned anatase at a temperature below 1000° C. until the diffraction pattern obtained upon a sample of the material shows substantially only the lines characteristic of rutile.

13. The process of making pigmentary rutile which includes forming an anatase by thermally hydrolyzing an aqueous solution of titanium tetrafluoride, nucleating an ilmenite solution containing an extender with a small quantity of said anatase, boiling, filtering and washing to form an extended anatase, and calcining at a temperature below 1000° C. to form an extended pigmentary rutile.

14. The process of making pigmentary rutile which includes forming an anatase by thermally hydrolyzing an aqueous solution of titanium tetrafluoride, nucleating an ilmenite solution containing calcium sulphate with a small quantity of said anatase, boiling, filtering and washing to form an extended anatase, and calcining at a temperature below 1000° C. to form an extended pigmentary rutile.

ANDREW T. McCORD.
HAROLD F. SAUNDERS.